(12) United States Patent
Zhang

(10) Patent No.: US 9,761,115 B2
(45) Date of Patent: Sep. 12, 2017

(54) METHOD AND APPARATUS FOR SELECTIVELY CONFIGURING ALARMS PRIOR TO COMMENCING SILENT MODE OF OPERATION

(71) Applicant: Nokia Technologies Oy, Espoo (FI)

(72) Inventor: Liang Zhang, Beijing (CN)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/907,983

(22) PCT Filed: Aug. 7, 2013

(86) PCT No.: PCT/CN2013/080961
§ 371 (c)(1),
(2) Date: Jan. 27, 2016

(87) PCT Pub. No.: WO2015/017996
PCT Pub. Date: Feb. 12, 2015

(65) Prior Publication Data
US 2016/0171871 A1    Jun. 16, 2016

(51) Int. Cl.
*G08B 21/24* (2006.01)
*H04M 1/725* (2006.01)
(Continued)

(52) U.S. Cl.
CPC ........... *G08B 21/24* (2013.01); *G08B 3/1008* (2013.01); *G08B 5/222* (2013.01);
(Continued)

(58) Field of Classification Search
CPC ........ G08C 17/02; G08C 23/04; G08C 19/28; G08C 2201/92; G08C 2201/20;
(Continued)

(56) References Cited

U.S. PATENT DOCUMENTS 9,197,760 B2 * 11/2015 Karakaya ............... H04M 19/04
9,210,530 B2 * 12/2015 Wei .......................... H04W 8/24
(Continued)

FOREIGN PATENT DOCUMENTS

CN    102055828    5/2011
CN    103167136    6/2013
(Continued)

OTHER PUBLICATIONS

International Search Report and Written Opinion received for corresponding Patent Cooperation Treaty Application No. PCT/CN2013/080961, dated May 28, 2014, 14 pages.
(Continued)

*Primary Examiner* — Mark Blouin
(74) *Attorney, Agent, or Firm* — Nokia Technologies Oy

(57) ABSTRACT

A method, apparatus and computer program product are provided to selectively configure alarms prior to commencement of a silent mode of operation. In the context of a method, an indication of at least a start time for a silent mode of operation of a device is received. Responsive to the indication of at least the start time for the silent mode of operation, one or more alarms are identified. Each alarm has an activation mode and an activation time during the silent mode of operation of the device. Responsive to identifying one or more alarms and prior to commencing the silent mode of operation, the method also causes a prompt to be presented regarding a potential change to at least one of the activation mode or the activation time for at least one alarm that was identified.

20 Claims, 5 Drawing Sheets

(51) Int. Cl.
   *H04M 19/04* (2006.01)
   *G08B 3/10* (2006.01)
   *G08B 5/22* (2006.01)

(52) U.S. Cl.
   CPC ... *H04M 1/72569* (2013.01); *H04M 1/72577* (2013.01); *H04M 19/04* (2013.01)

(58) Field of Classification Search
   CPC  G08C 2201/30; G08C 19/00; G08C 2201/70; G08C 2201/91
   USPC ......................................................... 340/4.31
   See application file for complete search history.

(56) References Cited

U.S. PATENT DOCUMENTS

| | | | |
|---|---|---|---|
| 9,363,010 B2* | 6/2016 | Lee | ................. H04M 1/7253 |
| 2004/0066300 A1 | 4/2004 | Dorenbosch | |
| 2009/0307616 A1 | 12/2009 | Nielsen | |
| 2011/0151851 A1 | 6/2011 | Foley et al. | |
| 2016/0358092 A1* | 12/2016 | Stolarz | ................. G06F 3/01 |

FOREIGN PATENT DOCUMENTS

| | | |
|---|---|---|
| EP | 2413578 A1 | 2/2012 |
| GB | 2410856 A | 8/2005 |
| JP | 2010004509 | 1/2010 |

OTHER PUBLICATIONS

"Silent Mode Timer Free", Google Play, Retrieved on Feb. 3, 2017, Webpage available at : https://play.google.com/store/apps/details?id=co.uk.sentinelweb.silenttimer&hl=en.

"Ring Reminder Update V2.0 Released for iPhone", Izoolu, Retrieved on Feb. 3, 2017, Webpage available at : http://www.izoolu.com/wp/ring-reminder-2-0-released-to-the-appstore/.

"Silent Reminder", Apple, Retrieved on Feb. 3, 2017, Webpage available at : https://itunes.apple.com/us/app/silent-reminder/id517477580?mt=8.

Extended European Search Report received for corresponding European Patent Application No. 13891022.9, dated Feb. 6, 2017, 8 pages.

* cited by examiner

METHOD AND APPARATUS FOR SELECTIVELY CONFIGURING ALARMS PRIOR TO COMMENCING SILENT MODE OF OPERATION

RELATED APPLICATION

This application was originally filed as PCT Application No. PCT/CN2013/080961 filed Aug. 7, 2013.

TECHNOLOGICAL FIELD

An example embodiment of the present invention relates generally to the configuration of alarms and, more particularly, to the selective configuration of alarms prior to commencing a silent mode of operation.

BACKGROUND

Computing devices may be configured to provide a variety of alarms. For example, users may interact with a computing device in order to set one or more alarms, such as one or more alarms intended to wake the user or to otherwise notify the user of the time of day. Additionally, computing devices may execute calendar applications. Calendar applications may permit a user to define one or more events and to request that alarms, such as one or more event reminders, be issued in association with the event. These event reminders may be issued at predetermined intervals in advance of the event so as to provide notification to the user as to the upcoming event and/or may be issued upon the commencement of the event or at one or more intervals thereafter. As such, many users have come to rely upon the alarms, including event reminders, that are administered by their computing devices in order to remain on schedule.

In some instances, a user may place their computing device in a silent mode of operation. For example, a user who carries a computing device to a movie theater, a play, a school performance or the like may place the computing device in a silent mode while at the movie, play or school performance so as to prevent the computing device from providing an audible alert in response to the receipt of an incoming call, an incoming message or the like (for example, certain types of notifications). In some instances, a computing device that has been placed in a silent mode of operation may still permit audible and/or visual alarms, for example, for certain types of notifications and/or events, such as those that have been scheduled by the user and/or that are associated with calendar events, to be output. However, the annunciation of these alarms during the silent mode may disrupt the event attended by the user or otherwise cause the user embarrassment or discomfort. In contrast, in other instances, a computing device operating in a silent mode may prevent any alarms that occur during the silent mode from being audibly announced. By silencing the alerts, the user fail to be reminded of an upcoming event or other time of the day that is of import and, as such, may miss an event or otherwise fail to remain on schedule.

As such, the administration of alarms by a computing device during a silent mode of operation may pose challenges when the user is not made aware of any alarms scheduled to be triggered during the silent mode of operation. Moreover, these challenges may be exacerbated in that a computing device may remain in the silent mode of operation for a longer period of time than is required or otherwise desired by the user. In this regard, a user may forget to cancel the silent mode of operation and to return to the normal mode of operation, thereby causing the computing device to continue to operate in the silent mode of operation for an indefinite period of time.

BRIEF SUMMARY

A method, apparatus and computer program product are provided according to an example embodiment in order to selectively configure alarms prior to commencing a silent mode of operation. By providing for the selective configuration of alarms prior to commencing the silent mode, the method, apparatus and computer program product of an example embodiment may permit certain alarms, such as those alarms associated with more important events, to be administered during the silent mode, while preventing or limiting the administration of other, potentially less important alarms during the silent mode. As such, a user may effectively define a relative priority between the silent mode of operation and respective ones of the alarms so as to be notified, even during the silent mode of operation, of certain alarms, while avoiding the disruption created by the administration of other alarms during the silent mode. Moreover, the method, apparatus and computer program product of an example embodiment may permit a user to tailor the manner in which the alarms are administered during the silent mode so as to further balance the relative priorities between the silent mode of operation and respective ones of the alarms.

In an example embodiment, a method is provided that includes receiving an indication of at least a start time for a silent mode of operation of a device and, responsive to the indication of at least the start time for the silent mode of operation, identifying one or more alarms that each have an activation mode and an activation time during the silent mode of operation of the device. Responsive to identifying one or more alarms and prior to commencing the silent mode of operation, the method of this embodiment also causes a prompt to be presented regarding a potential change to at least one of the activation mode or the activation time for at least one alarm that was identified. For example, the method may cause a prompt to be presented regarding whether the one or more alarms are to be administered audibly, vibrationally or without any audible or vibrational output. In an instance in which an alarm is to be administered audibly, the method may cause a prompt to be presented regarding a volume with which the one or more alarms are to be annunciated. The method may also administer the one or more alarms during the silent mode of operation in accordance with the instructions received in response to the prompt.

The method of an example embodiment may cause a prompt to be presented by causing one or more user-configurable options to be presented regarding changing at least one of the activation mode or the activation time for at least one of: (i) each of the at least one alarm and/or (ii) each group of one or more alarms. In an example embodiment, the method may identify one or more alarms having an activation mode that includes generation of an audible alert and an activation time during the silent mode of operation. In this embodiment, the method may cause the prompt to be presented regarding a potential change to at least one of the activation mode or the activation time for at least one alarm that was identified to have an activation mode that comprises generation of an audible alert and an activation time during the silent mode of operation. The method of an example embodiment may also include, following configuration of the silent mode of operation, causing a prompt to be presented upon creation of at least one additional alarm regarding at least one of the activation mode or activation time of the additional alarm in an instance in which the additional alarm has an activation time during the silent mode of operation.

The method of an example embodiment may receive not only the start time for the silent mode of operation, but also an indication of a fixed duration of the silent mode of operation. In this embodiment, the method may cause the prompt to be presented in conjunction with configuration of the fixed duration of the silent mode of operation including receipt of the indication of the fixed duration or following receipt of the indication of the fixed duration. The method of an example embodiment may identify one or more alarms by reviewing an application for which alarms may be generated to identify one or more events, scheduled to occur during operation in the silent mode, for which one or more reminders are to be provided. The method may identify a plurality of alarms and may then cause a plurality of prompts to be presented with each prompt associated with the manner in which a respective alarm is to be administered.

As described below, a corresponding apparatus and computer program product are also provided according to other example embodiments. The apparatus and computer program product may be configured to implement the various embodiments of the method described herein.

In this regard, an apparatus is provided in accordance with an example embodiment that includes a processor and a memory that includes computer program code with the memory and the computer program code configured to, with the processor, cause the apparatus to receive an indication of at least a start time for a silent mode of operation of a device. The memory and the computer program code are also configured to, with the processor, cause the apparatus, responsive to the indication of at least the start time for the silent mode of operation, to identify one or more alarms that each have an activation mode and an activation time during the silent mode of operation of the device and, responsive to identifying one or more alarms and prior to commencing the silent mode of operation, to cause a prompt to be presented regarding a potential change to at least one of the activation mode or the activation time for at least one alarm that was identified. In this regard, the memory and the computer program code may be configured to, with the processor, cause the apparatus to cause a prompt to be presented regarding whether the one or more alarms are to be administered audibly, vibrationally or without any audible or vibrational output. In an instance in which one or more alarms are to be administered audibly, the memory and the computer program code may be configured to, with the apparatus, cause the apparatus to cause a prompt to be presented regarding the volume with which the one or more alarms are to be annunciated. The memory and the computer program code may also configured to, with the processor, cause the apparatus to administer the one or more alarms during the silent mode of operation in accordance with the instructions received in response to the prompt.

The memory and the computer program code may be configured to, with the processor, cause the apparatus of an example embodiment to cause a prompt to be presented by causing one or more user-configurable options to be presented regarding changing at least one of the activation mode or the activation time for at least one of: (i) each of the at least one alarm and/or (ii) each group of one or more alarms. In an example embodiment, the memory and the computer program code may be configured to, with the processor, cause the apparatus to identify one or more alarms having an activation mode that includes generation of an audible alert and an activation time during the silent mode of operation. In this embodiment, the memory and the computer program code may be configured to, with the processor, cause the apparatus to cause the prompt to be presented regarding a potential change to at least one of the activation mode or the activation time for at least one alarm that was identified to have an activation mode that comprises generation of an audible alert and an activation time during the silent mode of operation. The memory and the computer program code may also be configured to, with the processor, cause the apparatus of an example embodiment, following configuration of the silent mode of operation, to cause a prompt to be presented upon creation of at least one additional alarm regarding at least one of the activation mode or activation time of the additional alarm in an instance in which the additional alarm has an activation time during the silent mode of operation.

The memory and the computer program code may be configured to, with the processor, cause the apparatus of an example embodiment to receive not only the start time for the silent mode of operation, but also an indication of a fixed duration of the silent mode of operation. In this embodiment, the memory and the computer program code may be configured to, with the processor, cause the apparatus to cause the prompt to be presented in conjunction with configuration of the fixed duration of the silent mode of operation including receipt of the indication of the fixed duration or following receipt of the indication of the fixed duration. The memory and the computer program code may be configured to, with the processor, cause the apparatus of an example embodiment to identify one or more alarms by reviewing an application for which alarms may be generated to identify one or more events, scheduled to occur during operation in the silent mode, for which one or more reminders are to be provided. In an instance in which the memory and the computer program code, with the processor, cause the apparatus to identify a plurality of alarms, the memory and the computer program code may be configured to, with the processor, cause the apparatus to cause a plurality of prompts to be presented with each prompt associated with the manner in which a respective alarm is to be administered.

The apparatus of an example embodiment may also include a display and user interface circuitry configured to control at least some functions of the display. In this embodiment, the user interface circuitry is responsive to the processor so as to cause the query to be presented upon the display. The apparatus of an example embodiment may be embodied as a mobile terminal.

In a further example embodiment, a computer program product is provided that includes a non-transitory computer-readable medium having program code portions stored therein with the program code portions configured, upon execution, to receive an indication of at least a start time for a silent mode of operation of a device and, responsive to the indication of at least the start time for the silent mode of operation, to identify one or more alarms that each have an activation mode and an activation time during the silent mode of operation of the device. The program code portions are also configured, responsive to identifying one or more alarms and prior to commencing the silent mode of operation, to cause a prompt to be presented regarding a potential change to at least one of the activation mode or the activation time for at least one alarm that was identified. For example, the program code portions may be configured to cause a prompt to be presented regarding whether the one or more alarms are to be administered audibly, vibrationally or without any audible or vibrational output. In an instance in which the one or more alarms are to be administered audibly, the program code portions may be configured to cause a prompt to be presented regarding the volume with which the one or more alarms are to be annunciated. The program code portions may also be configured to administer the one or more alarms during the silent mode of operation in accordance with the instructions received in response to the prompt.

The program code portions may be configured to cause a prompt to be presented by causing one or more user-configurable options to be presented regarding changing at least one of the activation mode or the activation time for at least one of: (i) each of the at least one alarm and/or (ii) each group of one or more alarms. In an example embodiment, the program code portions may be configured to identify one or more alarms having an activation mode that includes generation of an audible alert and an activation time during the silent mode of operation. In this embodiment, the program code portions may be configured to cause the prompt to be presented regarding a potential change to at least one of the activation mode or the activation time for at least one alarm that was identified to have an activation mode that comprises generation of an audible alert and an activation time during the silent mode of operation. The program code portions of an example embodiment may also be configured, following configuration of the silent mode of operation, to cause a prompt to be presented upon creation of at least one additional alarm regarding at least one of the activation mode or activation time of the additional alarm in an instance in which the additional alarm has an activation time during the silent mode of operation.

The program code portions of an example embodiment may be configured to receive not only the start time for the silent mode of operation, but also an indication of a fixed duration of the silent mode of operation. In this embodiment, the program code portions may be configured to cause the prompt to be presented in conjunction with configuration of the fixed duration of the silent mode of operation including receipt of the indication of the fixed duration or following receipt of the indication of the fixed duration. The program code portions of an example embodiment may be configured to identify one or more alarms by reviewing an application for which alarms may be generated to identify one or more events, scheduled to occur during operation in the silent mode, for which one or more reminders are to be provided. The program code portions of an example embodiment may be configured to identify a plurality of alarms and to cause a plurality of prompts to be presented with each prompt associated with the manner in which a respective alarm is to be administered.

In yet another example embodiment, an apparatus is provided that includes means for receiving an indication of at least a start time for a silent mode of operation of a device and means, responsive to the indication of at least the start time for the silent mode of operation, for identifying one or more alarms that each have an activation mode and an activation time in the silent mode of operation of the device. The apparatus also includes means, responsive to identifying one or more alarms and prior to commencing the silent mode of operation, for causing a prompt to be presented regarding a potential change to at least one of the activation mode or the activation time for at least one alarm that was identified. For example, the apparatus may include means for causing a prompt to be presented regarding whether the one or more alarms are to be administered audibly, vibrationally or without any audible or vibrational output. In an instance in which the one or more alarms are to be administered audibly, the apparatus may include means for causing a prompt to be presented regarding a volume with which the one or more alarms are to be annunciated. The apparatus may also include means for administering the one or more alarms during the silent mode of operation in accordance with instructions received in response to the prompt.

The means for causing a prompt to be presented may include means for causing one or more user-configurable options to be presented regarding changing at least one of the activation mode or the activation time for at least one of: (i) each of the at least one alarm and/or (ii) each group of one or more alarms. In an example embodiment, the means for identifying one or more alarms may include means for identifying one or more alarms having an activation mode that includes generation of an audible alert and an activation time during the silent mode of operation. In this embodiment, the means for causing the prompt to be presented may include means for causing the prompt to be presented regarding a potential change to at least one of the activation mode or the activation time for at least one alarm that was identified to have an activation mode that comprises generation of an audible alert and an activation time during the silent mode of operation. The apparatus of an example embodiment may also include, following configuration of the silent mode of operation, means for causing a prompt to be presented upon creation of at least one additional alarm regarding at least one of the activation mode or activation time of the additional alarm in an instance in which the additional alarm has an activation time during the silent mode of operation.

The means for receiving the start time for the silent mode of operation may also include means for receiving an indication of a fixed duration of the silent mode of operation. In this embodiment, the means for causing the prompt to be presented may include means for causing the prompt to be presented in conjunction with configuration of the fixed duration of the silent mode of operation including receipt of the indication of the fixed duration or following receipt of the indication of the fixed duration. The means for identifying one or more alarms may include means for reviewing an application for which alarms may be generated to identify one or more events, scheduled to occur during operation in the silent mode, for which one or more reminders are to be provided. In an example embodiment, the means for identifying one or more alarms may include means for identifying a plurality of alarms and the means for causing the prompt to be presented may include means for causing a plurality of prompts to be presented with each prompt associated with the manner in which a respective alarm is to be administered.

BRIEF DESCRIPTION OF THE DRAWINGS

Figure 1:
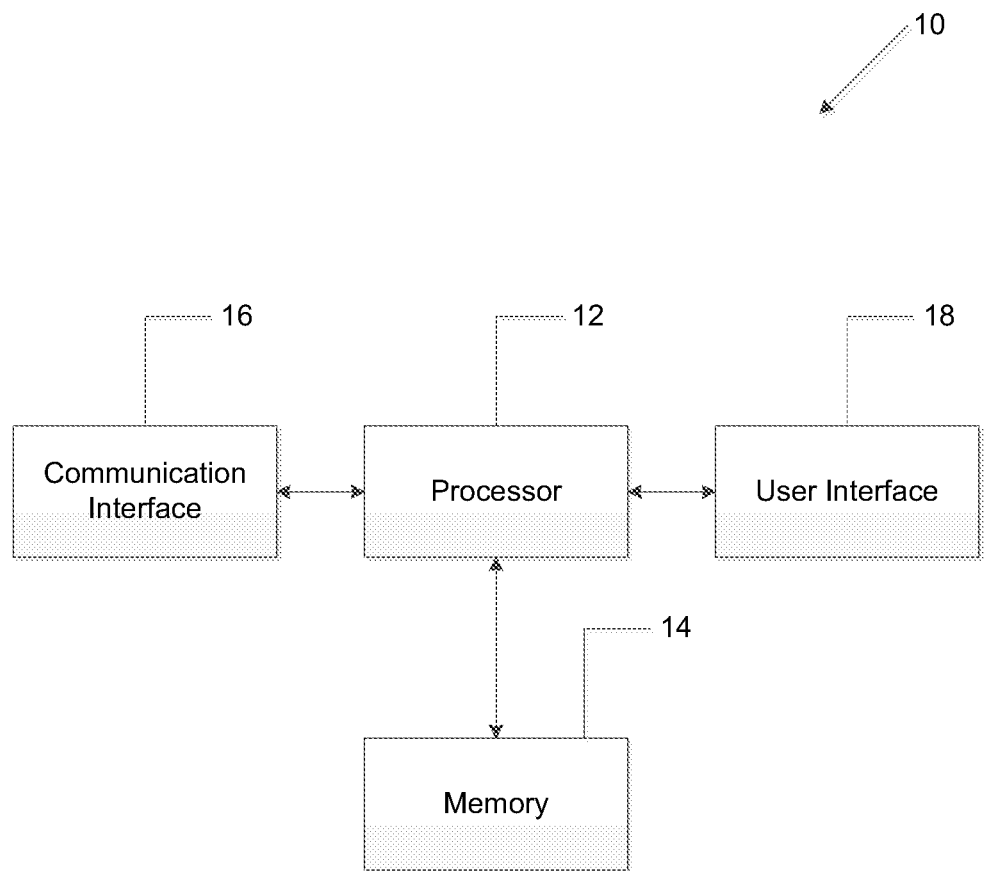
Figure 2:
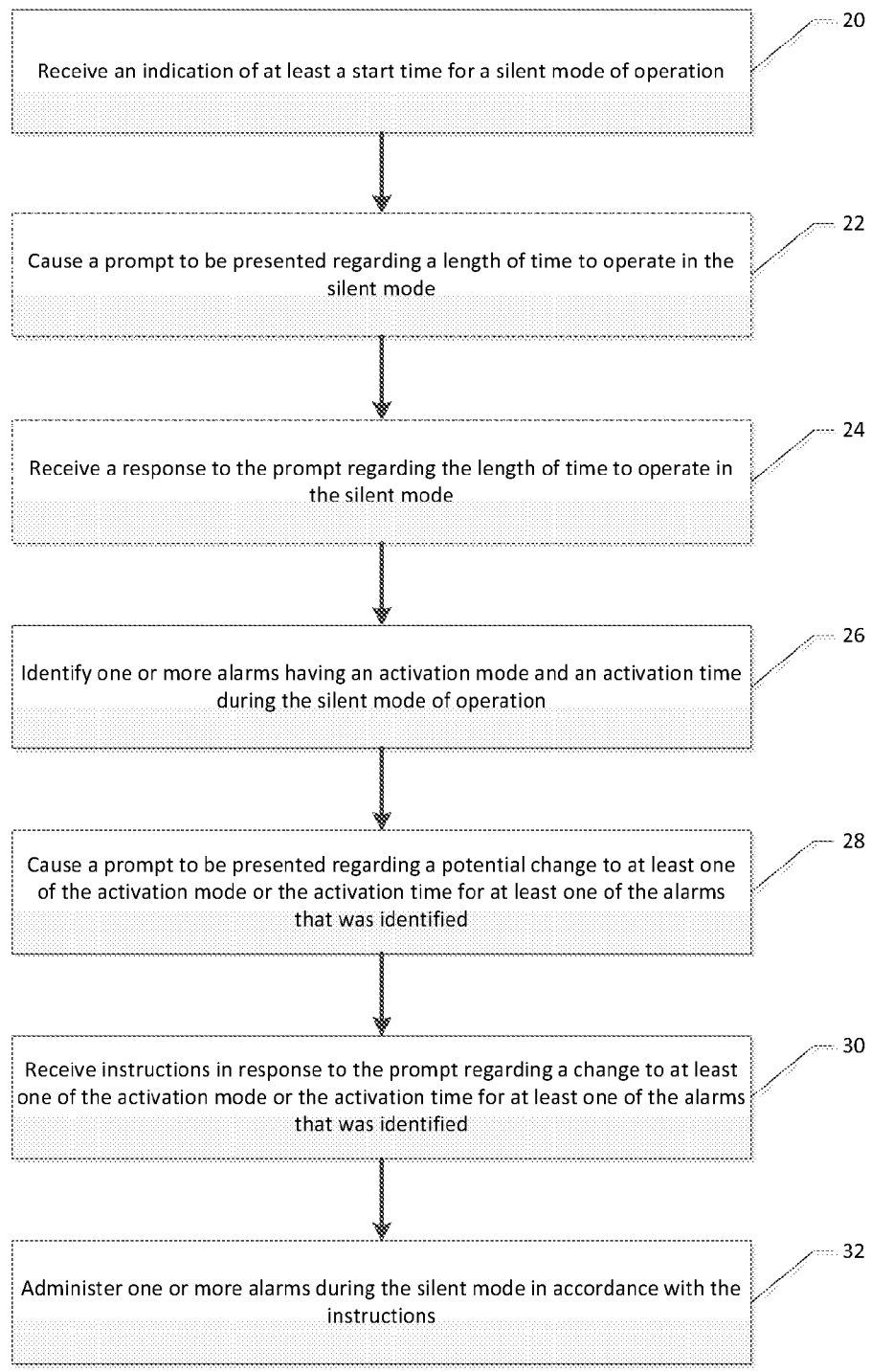
Figure 3:
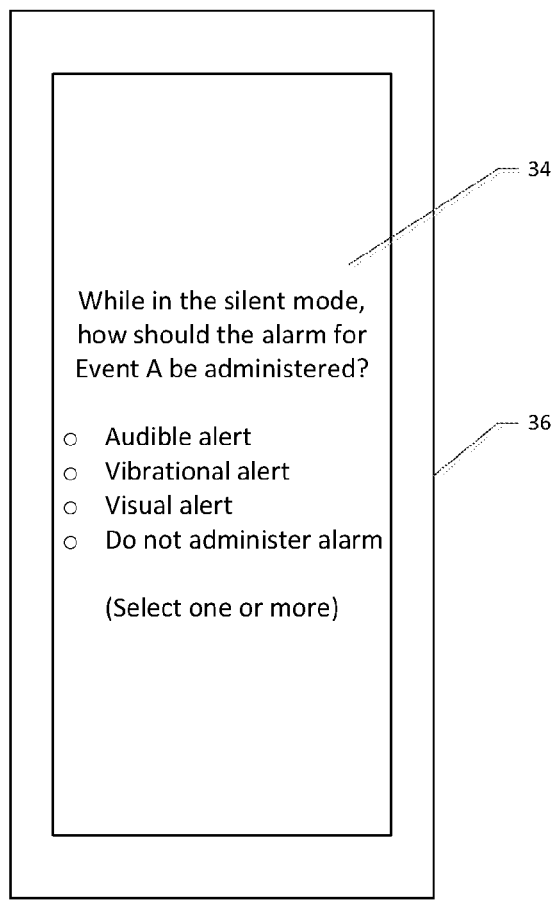
Figure 4:
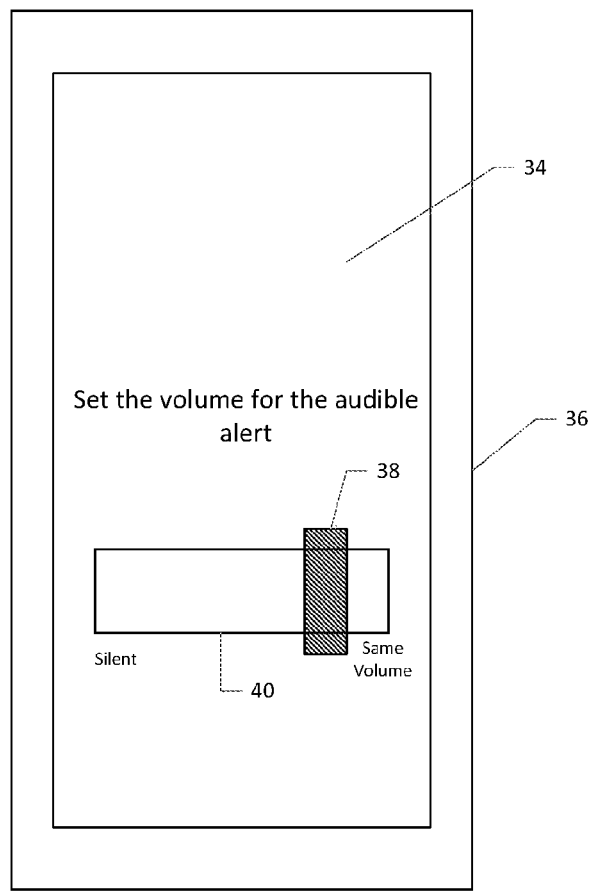
Figure 5:
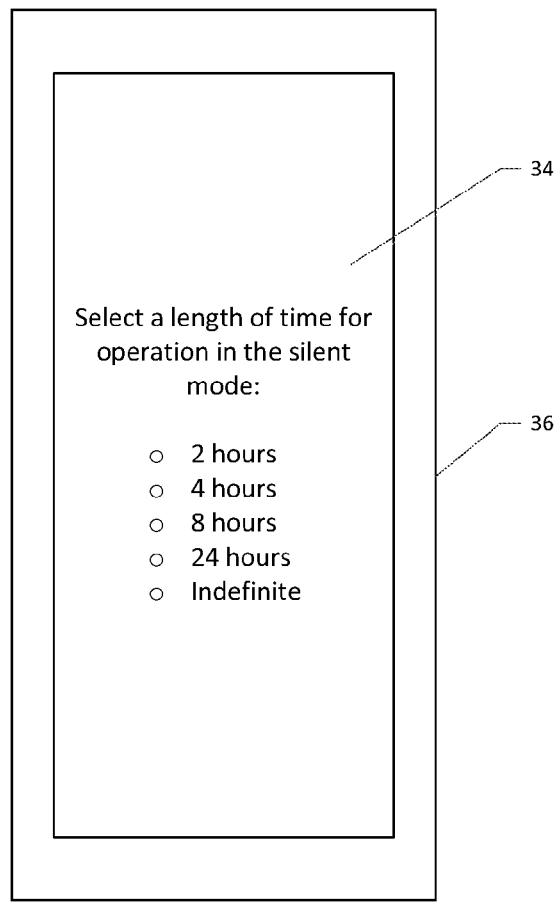

Having thus described certain example embodiments of the present disclosure in general terms, reference will hereinafter be made to the accompanying drawings, which are not necessarily drawn to scale, and wherein:

FIG. 1 is a block diagram of an apparatus that may be specifically configured in accordance with an example embodiment of the present invention;

FIG. 2 is a flowchart illustrating operations performed, such as by the apparatus of FIG. 1, in accordance with an example embodiment of the present invention;

FIG. 3 is an example of a prompt that may be presented regarding the manner in which an alarm is to be administered during the silent mode in accordance with an example embodiment of the present invention;

FIG. 4 is an example of a prompt that may be presented in an instance in which an alarm is to be administered audibly during the silent mode which solicits input regarding a volume with which the alarm is to be annunciated in accordance with an example embodiment of the present invention; and FIG. 5 is an example of a prompt that may be presented regarding a length of time during which to operate in the silent mode in accordance with an example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

A method, apparatus and computer program product are provided in accordance with an example embodiment in order to selectively configure one or more alarms prior to commencing a silent mode of operation of a computing device. As such, a user may prioritize operation in the silent mode with respect to one or more alarms that are otherwise scheduled to occur during the silent mode. Consequently, the computing device may be configured to both operate in the silent mode and to selectively provide notification(s) associated with one or more alarms during the silent mode in instances in which the user has defined the one or more alarms to have priority with respect to the silent mode of operation. In an instance in which an alarm is to be provided during the silent mode, the method, apparatus and computer program product of an example embodiment may permit the manner in which the alarm is to be administered to be tailored in order to further balance the competing concerns of operation in the silent mode and a desire for notification of the alarm.

The method, apparatus and computer program product may be performed by or in association with a variety of computing devices. For example, the computing device that provides for selective configuration of alarms prior to commencing a silent mode of operation may be a user device, such as a mobile terminal including, for example, a portable digital assistant (PDA), mobile telephone, smartphone, pager, mobile television, gaming device, laptop computer, camera, tablet computer, touch surface, video recorder, audio/video player, radio, electronic book, positioning device (e.g., global positioning system (GPS) device), or any combination of the aforementioned, and other types of voice and text communications systems. Alternatively, the user device that embodies or is otherwise associated with a method, apparatus and computer program product of an example embodiment may be a fixed or other non-mobile computing device, such as a desktop computer, a personal computer, a workstation or the like. Still further, the computing device may be a server or other network device that may be configured to manage the administration of alerts for one or more user devices. For purposes of illustration, but not of limitation, a computing device operated by a user will be hereinafter described in conjunction with the selective configuration of one or more alarms prior to commencing a silent mode of operation.

Regardless of the manner in which the computing device is embodied, the computing device may include or otherwise be associated with an apparatus 10, such as that shown in FIG. 1, that is specifically configured in accordance with an example embodiment of the present invention to selectively configure one or more alarms prior to commencing a silent mode of operation. The apparatus may include or otherwise be in communication with a processor 12, a memory device 14, an optional communication interface 16 and a user interface 18. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 10 may be embodied by a computing device. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 12 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 12 may be configured to execute instructions stored in the memory device 14 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a mobile terminal or a fixed computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

Although the apparatus 10 and, as such, the computing device that embodies or is otherwise associated with the apparatus may be configured to operate on an independent and standalone basis without communication with other computing devices and/or a communications network, the apparatus of an example embodiment may also include a communication interface 16 that may be any means such as a device or circuitry embodied in either hardware or a combination of hardware and software that is configured to receive and/or transmit data from/to a communications device in communication with the apparatus 10, such as to facilitate communications therebetween. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware and/or software for supporting communication via cable, digital subscriber line (DSL), universal serial bus (USB) or other mechanisms.

The apparatus 10 also generally includes a user interface 18 that may, in turn, be in communication with the processor 12 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processor may comprise user interface circuitry configured to control at least some functions of one or more user interface elements such as a display and, in some embodiments, a plurality of speakers, a ringer, one or more microphones and/or the like. The processor and/or user interface circuitry comprising the processor may be configured to control one or more functions of one or more user interface elements through computer program instructions (e.g., software and/or firmware) stored on a memory accessible to the processor (e.g., memory device 14, and/or the like).

Referring now to FIG. 2, the operations performed, such as by the apparatus 10 of FIG. 1, in order to selectively configure alarms prior to commencing a silent mode of operation in accordance with an example embodiment are illustrated. In some examples of embodiments of the apparatus, method and computer program product, a silent mode may be configured within an application such as a calendar application, while, in other examples, a silent mode may be configured for the apparatus using a stand-alone application or as part of the settings menu of the apparatus. Regardless of the manner in which the silent mode is configured and as shown in block 20, the apparatus may include means, such as the processor 12, user interface 18, communication interface 16 or the like, for receiving an indication of at least a start time for a silent mode of operation of the user device. The indication to operate in a silent mode and the start time for the silent mode of operation may be provided in a variety of manners. For example, the processor may be configured to recognize a predefined key sequence entered by a user in order to initiate operation in the silent mode. Additionally or alternatively, the processor may be configured to recognize a selection by a user from a menu to initiate operation in the silent mode. In conjunction with entry of the predefined key sequence or selection from the menu, a user may provide an indication of the start time for the silent mode of operation. Alternatively, the apparatus may be configured such that the start time for the silent mode of operation has a predefined relationship to the time at which the indication to operate in the silent mode is received, such as by commencing a predefined time following receipt of the indication to operate in the silent mode. Still further, the processor may be configured to receive an indication to operate in the silent mode and the start time for the silent mode of operation from a calendar or other application in which an event is scheduled that is associated with the silent mode of operation. The foregoing are provided by way of example and the apparatus, such as the processor, may additionally or alternatively be configured to receive an indication to operate in the silent mode and the start time for the silent mode of operation in other manners, such as based upon information received a server or other network device and/or based upon information received from other proximate devices, such as one or more mobile terminals, an access point or the like, that directs operation in the silent mode and provides an indication of the start time for the silent mode of operation.

During the silent mode, the user device will not generate audible output to alert the user of an incoming call, an incoming message or the like. Thus, the user device generally remains quiet during the silent mode of operation. In accordance with an example embodiment of the present invention, however, the apparatus 10 may include means, such as the processor 12 or the like, for identifying one or more alarms having an activation mode and an activation time during the silent mode of operation of the user device. See block 26 of FIG. 2. This identification of the one or more alarms is in response to the indication of at least the start time for the silent mode of operation. In an example embodiment, alarms are identified that have an activation mode that provides for the generation of an audible alert and an activation time during the silent mode of operation. The processor may be configured to identify the one or more alarms in a variety of manners including by review of an application for which alarms, by which term any appropriate form of alert including at least an audible component is intended, including such as and not limited to, for example, event reminders, may be generated. Various applications may generate event reminders, such as an alarm clock application, an application relating to exercise, e.g., running, an application related to health care that may issue event reminders to take medication, an application relating to an on-line auction that may issue an event reminder near or at the conclusion of the auction, etc. By way of example, a calendar application that is executed by the processor, stored in memory 14 or otherwise accessible by the processor may identify one or more events, scheduled to occur during operation in the silent mode, for which one or more reminders are to be provided. For example, the reminders may be reminders that would be provided in advance of the event, at the commencement of the event or thereafter. Additionally or alternatively, the processor may be configured to identify one or more alarms that have been scheduled by the user, such as alarms intended to wake the user or otherwise alert the user as to a particular time of day. For example, the alarms that have been scheduled by the user may be stored in memory, such as by the calendar application or otherwise.

In response to identifying one or more alarms and prior to commencing the silent mode of operation, the apparatus 10 of an example embodiment may also include means, such as the processor 12, the user interface 18, the communication interface 16 or the like, for causing a prompt to be presented regarding a potential change to at least one of the activation mode or the activation time for at least one of the alarms that was identified. See block 28 of FIG. 2. In this regard, the prompt may be presented regarding a potential change to at least one of the activation mode or the activation time for at least one alarm that was identified to have an activation mode that provides for the generation of an audible alert and an activation time during the silent mode of operation. The prompt may permit the user to change the activation mode and/or the activation time in a variety of different manners for respective ones of the alarms that were identified. For example, the prompt may present one or more user-configurable options regarding changing at least one of the activation mode or the activation time for at least one of the alarms that was identified. As shown in FIG. 3, for example, the apparatus, such as the processor, of an example embodiment may cause a prompt to be presented upon the user interface, such as upon a display 34 of the user device 36, regarding a potential change in the activation mode of at least one of the alarms by inquiring as to whether one or more alarms are to be administered audibly, vibrationally, visually or without any audible or vibrational output during the silent mode. Based upon their selection(s), a user may effectively prioritize operation in the silent mode with the user device remaining quiet relative to the administration of one or more alarms during the silent mode. Additionally, the user may tailor the manner in which the alarm is to be administered, if at all, during the silent mode by changing the activation mode, such as by selecting an audible alert, a vibrational alert, a visual alert, both an audible and a vibrational alert, no audible or vibrational alert or the like, as shown in FIG. 3. In addition to or instead of changing the activation mode of an alarm, the prompt may permit the user to change the activation time of an alarm, such as by delaying the alarm until the conclusion of the silent mode of operation.

As such, the apparatus 10 of this example embodiment may also include means, such as a processor 12, the user interface 18, the communication interface 16 or the like, for receiving instructions, such as from the user, in response to the prompt regarding any change to the activation mode and/or the activation time for at least one alarm that was identified as otherwise having an activation time during the silent mode. See block 30 of FIG. 2. In the embodiment of FIG. 3, for example, the apparatus, such as the processor and/or the user interface, may receive the selection by a user of one or more of the options regarding a change to the activation mode, such as a change in the manner in which an alarm is to be administered during the silent mode. In an instance in which the instructions indicate that the one or more alarms are to be administered audibly, the apparatus of an example embodiment may also include means, such as a processor, the user interface, the communication interface or the like, for causing a prompt to be presented regarding a volume with which the one or more alarms are to be audibly annunciated. As shown in FIG. 4, for example, the apparatus, such as the processor, may cause a prompt to be presented upon the display 34 of the user device 36 via which the user may provide an indication as to the volume with which an audible alert is to be annunciated. For example, the user may select that the alarm be annunciated at the same volume as that which the alarm would be annunciated if the user device were not operating in the silent mode or at a lower volume. The user may provide the indication in a variety of manners in response to the query, such as by selection of one of a plurality of predefined options or by movement of a handle 38 along the slider bar 40 as shown in FIG. 4.

The apparatus 10, such as the processor 12, may be configured to cause a single prompt to be presented regarding any change in the activation mode and/or activation time of the alarms that have been identified to be scheduled to occur during the silent mode with all of the alarms thereafter being administered in the same manner as indicated by the user in response to the prompt. However, in an instance in which a plurality of alarms are identified that have an original activation time during operation in the silent mode, the apparatus, such as the processor, may be configured to cause a plurality of prompts to be administered, such as in a sequential manner, with each prompt inquiring regarding a potential change to the activation mode and/or activation time of a respective alarm. By responding to prompts, the user may provide instructions regarding any change to the activation mode and/or activation time of each individual alarm, thereby directing the manner in which each individual alarm is to be administered, regardless of the manner in which the other alarms are to be administered during the silent mode. For example, a user may provide instructions that a first alarm is to be audibly annunciated, while there should be no audible or vibrational output in response to a second alarm. Thus, the apparatus, such as the processor, of this example embodiment may permit a user to tailor the manner in which the alarms are administered during the silent mode on an individual basis as part of the configuration of a silent mode, but before the configured silent mode is activated on the device.

While the apparatus 10, such as the processor 12, may cause a single prompt to be presented regarding a potential change to the activation mode and/or the activation time that would be effective for all of the alarms that are to be administered during the silent mode or a plurality of prompts to be issued regarding potential changes to the activation mode and/or the activation time for each individual alarm that is to be administered during the silent mode, the apparatus, such as the processor, of another example embodiment may issue a plurality of prompts regarding a potential change to the activation mode and/or activation time for different types or groups of alarms, each prompt associated with a different type or group of alarm. The types of alarms may be defined in various manners. In one example embodiment, an alarm scheduled by the user may be considered a first type, an alarm associated with a business-oriented calendar event may be considered a second type, an alarm associated with a personal-related calendar event may be considered a third type, etc. Similarly, groups of alarms may be defined in various manners. Examples of an alert groups include: alerts of the type reminding of repeat events, for example, a group of alerts for birthdays and/or anniversaries, a group of alerts for taking medication, a group of alerts of the type for regularly scheduled events such as meetings, a group of alerts for health checks or a group of alerts for car maintenance. Some alert groups may comprise alerts generated by a particular application or type of application (for example, reminder events for ending auctions which might be generated by on-line auction applications, workout events associated with exercise applications, etc.) As such, a user may provide instructions in accordance with this example embodiment regarding the manner in which each different type or group of alarm is administered so as to permit different types or groups of alarms to be administered in different manners without requiring as many prompts as typically would be required in order to obtain individual instructions for each respective alarm.

In some examples of embodiments of the apparatus 10 and method, during configuration of the silent mode, after an indication of a duration of a silent mode has been received from the user as described below, the apparatus, such as the processor 12, may perform a check to identify any one or more types or groups of alarms (hereinafter generically referenced as groups of alarms) and/or any individual alarms scheduled to be triggered during the period of the defined silent mode. The apparatus, such as the processor, the user interface or the like, may then generate and display an indication in an appropriate form, such as in a list or array, each type or group of alarms and/or each individual alarm to enable the user to modify the activation mode and/or activation time, e.g., the audible and/or vibrational setting(s), at an individual alarm group and/or an individual alarm level. In this way, the activation mode and/or activation time, e.g., the audible/vibrational alert settings, previously configured for each individual alarm group and/or each individual alarm are capable of being overridden, either by default or by user defined audible (including vibrational) alarm setting(s) that are active only during the defined period of the silent mode of device operation. This enables in some examples of embodiments a user to be able to prioritize between alarm groups comprising a group of the same type of alarms and/or individual alarms (which may be in the same or different groups) and the importance of maintaining the silent mode of operation.

In some examples of embodiments of the apparatus 10 and method, within an alarm group, a user may wish to set exceptions for particular alarms relative to the general rule that has otherwise been established for all alarms in the respective group during the defined silent mode. As such, the apparatus, such as the processor 12, may be configured to permit prompts to be presented not only regarding any change in the activation mode and/or activation time for a group of alarms, but also, in an example embodiment, for individual alarms within the group so as to permit the user to indicate that the activation mode and/or activation time of one or more alarms within the group are to be changed in a different fashion than that in which the group of alarms is to be otherwise treated. For example, a user visiting the theatre who sets an alarm group level override to silence all medication alerts during the show, can set as an exception a vibration alert override for one medication alert. In this way, a user can be reminded to take their heart medication, but is not disturbed by reminders for taking hay fever medication, vitamin tablets, etc.

As shown in block 32 of FIG. 2, the apparatus 10 may also include means, such as the processor 12, the user interface 18, the communication interface 16 or the like, for administering the one or more alarms during the silent mode in accordance with the instructions received in response to the prompt. For example, in an instance in which the instructions received from the user have indicated that an alarm is to be administered audibly, the alarm may be audibly annunciated at its respective activation time even though the user device is otherwise operating in the silent mode. In an embodiment in which the user has not only selected that an alarm is to be administered audibly, but has also selected the volume with which the alarm is to be annunciated, the alarm may be administered audibly at the selected volume. Alternatively, in an instance in which the user has selected to administer an alarm vibrationally, the user device may be configured to vibrate or otherwise provide tactile feedback at the activation time of the respective alarm. This vibrational output may be instead of or in addition to audible output depending upon the selection of the user in response to the prompt regarding the respective alarm. Still further, in an instance in which the instructions provided by the user indicate that an alarm is to be administered without any audible or vibrational output, the user device may remain silent and may not vibrate at the activation time of the alarm. In an instance in which the instructions received from a user indicate that no audible or vibrational output is to be provided in response to an alert, the apparatus may be configured in some embodiments to provide no indication of the alarm. In other embodiments, however, the apparatus, such as the processor, may be configured to provide a visual alert upon the display of the user device at the activation time of the respective alarm such that the user may be notified as to the alarm even though the user device does not provide any audible or vibrational output.

As such, the method, apparatus and computer program product of an example embodiment permit a user to define a relative priority between operation in the silent mode and the administration of one or more alarms during the silent mode of operation. As such, a user may elect to be notified of some alarms, but to receive no notification of other alarms during the silent mode of operation depending, for example, upon the relative prioritization of the silent mode of operation with respect to the respective alarms. Moreover, the method, apparatus and computer program product of an example embodiment may permit a user to tailor the manner in which one or more alarms are administered, if at all, during the silent mode of operation by permitting changes in the activation mode and/or activation time of the alarms that were identified such that the user may be appropriately alerted of alarm while still generally operating in the silent mode of operation.

As noted above, the apparatus 10, such as the processor 12, may be configured to identify alarms that have an activation time during the silent mode of operation. In order to identify the respective alarms, the apparatus, such as the processor, may be configured to determine the duration of the silent mode. While the silent mode of operation may be predefined so as to last a predetermined length of time or the user may define the duration of the silent mode in conjunction with the instructions that place the user device into the silent mode of operation, the apparatus of an example embodiment may also include means, such as the processor, the user interface 18, the communication interface 16 or the like, for causing a prompt to be presented, such as upon a display of the user device, regarding the length of time during which to operate in the silent mode, such as in response to having received an indication of operation in the silent mode. See block 22 of FIG. 2. Although the apparatus, such as the processor, may cause a variety of prompts to be presented including a query that solicits the user's entry of the length of time, such as in minutes, hours, etc., for the silent mode of operation, FIG. 5 presents one example of a prompt that may be presented that permits a user to select a length of time during which operation will be conducted in the silent mode.

As the foregoing examples illustrate, the silent mode of operation may have a fixed duration and the apparatus 10 may include means, such as the processor 12, the user interface 18, the communication interface 16 or the like, for receiving an indication of the fixed duration of the silent mode of operation. For example, as shown in block 24, the apparatus may also include means, such as the processor, the user interface, the communication interface or the like, for receiving a response to the prompt regarding the length of time during which to operation in the silent mode. The prompt regarding to potential change to the activation mode and/or the activation time for at least one alarm may occur in conjunction with the configuration of the fixed duration of the silent mode of operation, such as in conjunction with the receipt of an indication of the fixed duration, or following the configuration of the fixed duration of the silent mode of operation, such as following receipt of the indication of the fixed duration. By way of example, based upon the fixed duration of the silent mode, the apparatus, such as the processor, may identify one or more alarms having an activation time during the fixed duration of the silent mode and may subsequently prompt the user regarding any change in the activation mode and/or activation time for the alarms. As such, the method, apparatus and computer program product of this example embodiment may prevent or reduce the instances in which a user may forget to terminate the silent mode of operation by prompting the user upon receiving the indication of operation in the silent mode as to the length of time to remain in the silent mode. Moreover, the length of time that is identified by the user for operation in the silent mode permits the alarms that have an activation time during the silent mode of operation to be identified with more precision.

In an instance in which the user cannot or does not identify a specific length of time for operation in the silent mode, such as in an instance in which the user selects an indefinite period of time during which to operate in silent mode, the apparatus 10, such as the processor 12, may identify all subsequent alarms having an activation time following the current time of day as alarms that are to occur during the silent mode and may subsequently prompt the user as to any changes in the activation mode and/or activation time of those alarms. Alternatively, the apparatus, such as the processor, may only identify those alarms having an activation time within a predefined period of time, such as 8 hours, 12 hours, 24 hours, etc., following receipt of the indication of the operation in silent mode and may only prompt the user regarding any changes in the activation mode and/or activation time of the alarms having an original activation time within that predefined period of time so as not to cause the user to respond to a potentially large number of prompts for a silent mode of operation that will last indefinitely. In this example embodiment, the apparatus, such as the processor, may be configured to again cause a prompt to be presented regarding the length of time that the silent mode of operation is to remain in effect at the end of the predefined period of time. This additional prompt may be presented upon or in advance of expiration of the predefined period of time. Based upon the instructions provided by the user regarding the length of time that the silent mode will remain in effect, the apparatus, such as the processor, may again determine the alarms that will occur during the silent mode and may thereafter cause a prompt to be presented regarding any change in the activation mode and/or activation time of those alarms, such that those alarms are also administered in the manner instructed by the user. This process of prompting the user regarding the length of time that the silent mode will remain in effect may be repeated until the silent mode of operation is terminated.

When a silent mode has already been configured (which may be for a single or a repeated duration of time (e.g., for a regular meeting or regular period of sleep)), a user may wish to create a new event alarm (including any of the aforementioned types of alarms including those generated, for example, by a calendar application and/or event reminders, such as for incoming messages) after the silent mode has been defined (which may or may not be active at that point). In some examples of embodiments of the apparatus 10 and method, the apparatus, such as the processor 12, may be configured to cause a prompt regarding the activation mode and/or the activation time of a newly created alarm(s) to be presented as soon as the newly created alarm(s) is created or otherwise identified to be within the defined duration of the silent mode of operation so as to draw the user's attention to the alarm being scheduled within the duration of a silent mode. This prompt may also include an indication of the current silent mode setting for the group of alarms to which the new alarm belongs (either instead of or in addition to the normal operational mode for that type of alarm). The user may respond to the prompt by changing the activation mode and/or activation time for the newly created alarm and/or by changing the currently indicated default activation mode for the respective alarm group. If the user indications that the current silent mode settings are to be overridden for the newly created alarm or for the group of alarms to which the newly created alarm belongs, the activation time and/or activation mode for the respective alarm(s) during the silent mode of operation are updated accordingly.

As described above, FIG. 2 illustrates a flowchart of an apparatus 10, method, and computer program product according to example embodiments of the invention. It will be understood that each block of the flowchart, and combinations of blocks in the flowchart, may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 14 of an apparatus employing an embodiment of the present invention and executed by a processor 12 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, such as illustrated by the dashed outline of blocks 22 and 24 in FIG. 2. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
   receiving an indication of at least a start time for a silent mode of operation of a device;
   responsive to the receiving of the indication of at least the start time for the silent mode of operation, identifying one or more alarms, each alarm having an activation mode and an activation time during the silent mode of operation of the device; and
   responsive to the identifying one or more alarms and prior to commencing the silent mode of operation, causing a prompt to be presented regarding a potential change to at least one of the activation mode or the activation time for at least one alarm that was identified.

2. A method according to claim 1 wherein causing a prompt to be presented comprises causing one or more user-configurable options to be presented regarding changing at least one of the activation mode or the activation time for at least one of: (i) each of the at least one alarm and/or (ii) each group of one or more alarms.

3. A method according to claim 1 wherein identifying one or more alarms comprises identifying one or more alarms having an activation mode that comprises generation of an audible alert and an activation time during the silent mode of operation, and wherein causing the prompt to be presented comprises causing the prompt to be presented regarding a potential change to at least one of the activation mode or the activation time for at least one alarm that was identified to have an activation mode that comprises generation of an audible alert and an activation time during the silent mode of operation.

4. A method according to claim 1 wherein receiving the indication of at least the start time for the silent mode of operation comprises receiving an indication of a fixed duration of the silent mode of operation.

5. A method according to claim 4 wherein causing the prompt to be presented comprises causing the prompt to be presented in conjunction with configuration of the fixed duration of the silent mode of operation including receipt of the indication of the fixed duration.

6. A method according to claim 4 wherein causing the prompt to be presented comprises causing the prompt to be presented following configuration of the fixed duration of the silent mode of operation including following receipt of the indication of the fixed duration.

7. A method according to claim 1 further comprising, following configuration of the silent mode of operation, causing a prompt to be presented upon creation of at least one additional alarm regarding at least one of the activation mode or activation time of the additional alarm in an instance in which the additional alarm has an activation time during the silent mode of operation.

8. A method according to claim 1 wherein identifying one or more alarms comprises identifying a plurality of alarms, and wherein causing the prompt to be presented comprises causing a plurality of prompts to be presented with each prompt associated with the manner in which a respective alarm is to be administered.

9. An apparatus comprising a processor and a memory including computer program code, the memory and the computer program code configured to, with the processor, cause the apparatus to:
receive an indication of at least a start time for a silent mode of operation of a device;
responsive to the indication of at least the start time for the silent mode of operation, identify one or more alarms, each alarm having an activation mode and an activation time during the silent mode of operation of the device; and
responsive to identifying one or more alarms and prior to commencing the silent mode of operation, cause a prompt to be presented regarding a potential change to at least one of the activation mode or the activation time for at least one alarm that was identified.

10. An apparatus according to claim 9 wherein the memory and the computer program code are configured to, with the processor, cause the apparatus to cause a prompt to be presented by causing one or more user-configurable options to be presented regarding changing at least one of the activation mode or the activation time for at least one of: (i) each of the at least one alarm and/or (ii) each group of one or more alarms.

11. An apparatus according to claim 9 wherein the memory and the computer program code are configured to, with the processor, cause the apparatus to identify one or more alarms by identifying one or more alarms having an activation mode that comprises generation of an audible alert and an activation time during the silent mode of operation, and wherein the memory and the computer program code are configured to, with the processor, cause the apparatus to cause the prompt to be presented by causing the prompt to be presented regarding a potential change to at least one of the activation mode or the activation time for at least one alarm that was identified to have an activation mode that comprises generation of an audible alert and an activation time during the silent mode of operation.

12. An apparatus according to claim 9 wherein the memory and the computer program code are configured to, with the processor, cause the apparatus to receive the indication of at least the start time for the silent mode of operation by receiving an indication of a fixed duration of the silent mode of operation.

13. An apparatus according to claim 9 wherein the memory and the computer program code are further configured to, with the processor, cause the apparatus, following configuration of the silent mode of operation, to cause a prompt to be presented upon creation of at least one additional alarm regarding at least one of the activation mode or activation time of the additional alarm in an instance in which the additional alarm has an activation time during the silent mode of operation.

14. An apparatus according to claim 9 wherein the memory and the computer program code are configured to, with the processor, cause the apparatus to cause a plurality of prompts to be presented with each prompt associated with the manner in which a respective alarm is to be administered.

15. An apparatus according to claim 9 wherein the apparatus is embodied as a mobile terminal.

16. A non-transitory computer readable medium having program code portions stored thereon, the program code portions configured, upon execution, to:
receive an indication of at least a start time for a silent mode of operation of a device;
responsive to the indication of at least the start time for the silent mode of operation, identify one or more alarms, each alarm having an activation mode and an activation time during the silent mode of operation of the device; and
responsive to identifying one or more alarms and prior to commencing the silent mode of operation, cause a prompt to be presented regarding a potential change to at least one of the activation mode or the activation time for at least one alarm that was identified.

17. A non-transitory computer readable medium according to claim 16 wherein the program code portions configured to cause a prompt to be presented comprise program code portions configured to cause one or more user-configurable options to be presented regarding changing at least one of the activation mode or the activation time for at least one of: (i) each of the at least one alarm and/or (ii) each group of one or more alarms.

18. A non-transitory computer readable medium according to claim 16 wherein the program code portions configured to identify one or more alarms comprise program code portions configured to identify one or more alarms having an activation mode that comprises generation of an audible alert and an activation time during the silent mode of operation, and wherein the program code portions configured to cause the prompt to be presented comprise program code portions configured to cause the prompt to be presented regarding a potential change to at least one of the activation mode or the activation time for at least one alarm that was identified to have an activation mode that comprises generation of an audible alert and an activation time during the silent mode of operation.

19. A non-transitory computer readable medium according to claim 16 wherein the program code portions configured to receive the indication of at least the start time for the silent mode of operation comprise program code portions configured to receive an indication of a fixed duration of the silent mode of operation.

20. A non-transitory computer readable medium according to claim 16 wherein the program code portions are further configured, following configuration of the silent mode of operation, to cause a prompt to be presented upon creation of at least one additional alarm regarding at least one of the activation mode or activation time of the additional alarm in an instance in which the additional alarm has an activation time during the silent mode of operation.

* * * * *